United States Patent
Roessler et al.

(10) Patent No.: US 9,661,115 B2
(45) Date of Patent: May 23, 2017

(54) DEVICE ARRANGEMENT

(71) Applicant: ECOM Instruments GmbH, Assamstadt (DE)

(72) Inventors: Dieter Roessler, Forchtenberg-Ernsbach (DE); Dieter Hofmann, Lauda-Koenigshofen (DE)

(73) Assignee: ECOM Instruments GmbH (DE)

( * ) Notice: Subject to any disclaimer, the term of this patent is extended or adjusted under 35 U.S.C. 154(b) by 0 days.

(21) Appl. No.: 14/662,218

(22) Filed: Mar. 18, 2015

(65) Prior Publication Data

US 2015/0271308 A1 Sep. 24, 2015

(30) Foreign Application Priority Data

Mar. 19, 2014 (DE) .................. 10 2014 205 140

(51) Int. Cl.
*H04M 1/00* (2006.01)
*H04M 1/18* (2006.01)
*B65D 85/30* (2006.01)
*G06F 1/16* (2006.01)
*H04M 1/02* (2006.01)

(52) U.S. Cl.
CPC ............ *H04M 1/185* (2013.01); *B65D 85/30* (2013.01); *G06F 1/1626* (2013.01); *G06F 1/1656* (2013.01); *H04M 1/0202* (2013.01); *H04M 1/18* (2013.01); *G06F 2200/1633* (2013.01)

(58) Field of Classification Search
CPC ............................ H04M 1/185; H04M 1/0202
USPC .................... 455/575.1, 575.8, 128
See application file for complete search history.

(56) References Cited

U.S. PATENT DOCUMENTS

| 5,632,373 | A | * | 5/1997 | Kumar | G06F 1/1628 |
| | | | | | 206/305 |
| 8,599,547 | B2 | * | 12/2013 | Richardson | G06F 1/1626 |
| | | | | | 345/173 |
| 8,887,909 | B2 | * | 11/2014 | McCarthy | A45C 11/00 |
| | | | | | 206/320 |
| 8,958,856 | B2 | * | 2/2015 | Ali | G06F 1/1626 |
| | | | | | 455/575.1 |

(Continued)

FOREIGN PATENT DOCUMENTS

DE  4114450 A1  11/1992
DE  102012110725 B3  4/2014

(Continued)

OTHER PUBLICATIONS

English abstract has been provided for DE-102012110725.

(Continued)

*Primary Examiner* — Md Talukder
(74) *Attorney, Agent, or Firm* — Fishman Stewart PLLC

(57) ABSTRACT

A device arrangement may include an inner casing. The inner casing may include an inner casing base and an inner casing cover defining a cavity therebetween. The cavity may receive an electronic device. The inner casing base may have a first viewing window. A window pane may be composed of a transparent material and be attached to at least one of the electronic device and the inner casing. The window pane may at least partially seal the first viewing window. An outer casing may at least partially encase the inner casing. The inner casing may be mounted on the outer casing via a suspension/damping device.

20 Claims, 1 Drawing Sheet

(56) References Cited

U.S. PATENT DOCUMENTS

| | | | |
|---|---|---|---|
| 2005/0130721 A1* | 6/2005 | Gartrell | H04M 1/0283 455/575.8 |
| 2007/0223182 A1* | 9/2007 | Swan | G06F 1/1632 361/730 |
| 2008/0096620 A1* | 4/2008 | Lee | G06F 1/1626 455/575.8 |
| 2009/0017883 A1* | 1/2009 | Lin | A45C 11/00 455/575.8 |
| 2009/0111543 A1* | 4/2009 | Tai | H04M 1/0283 455/575.8 |
| 2011/0102341 A1* | 5/2011 | Imai | G06F 1/1626 345/173 |
| 2012/0212890 A1* | 8/2012 | Hoshino | H04M 1/0202 361/679.01 |
| 2013/0109435 A1* | 5/2013 | McCaughey | H01Q 1/243 455/556.1 |
| 2013/0146491 A1 | 6/2013 | Ghali et al. | |
| 2013/0193149 A1* | 8/2013 | Balourdet | A45F 5/00 220/560.01 |
| 2013/0295310 A1 | 11/2013 | Tages et al. | |
| 2014/0024419 A1* | 1/2014 | Norris | G08B 5/223 455/575.8 |
| 2014/0128131 A1* | 5/2014 | Sin | H04M 1/185 455/575.8 |
| 2014/0152890 A1* | 6/2014 | Rayner | G06F 1/1626 348/376 |
| 2015/0060505 A1* | 3/2015 | Brown | H04M 1/185 224/235 |
| 2015/0133203 A1* | 5/2015 | Xie | H04M 1/11 455/575.8 |
| 2015/0271308 A1* | 9/2015 | Roessler | H04M 1/0202 455/575.8 |

FOREIGN PATENT DOCUMENTS

| | | |
|---|---|---|
| WO | WO-2013/116370 A1 | 8/2013 |
| WO | WO-2013/181644 A1 | 12/2013 |

OTHER PUBLICATIONS

English abstract has been provided for DE-4114450.
German Search Report for DE-102014205140.0, mailed Feb. 10, 2015.
Search Report for EP 15157161.9, dated Jul. 28, 2015, 3 pp.

* cited by examiner

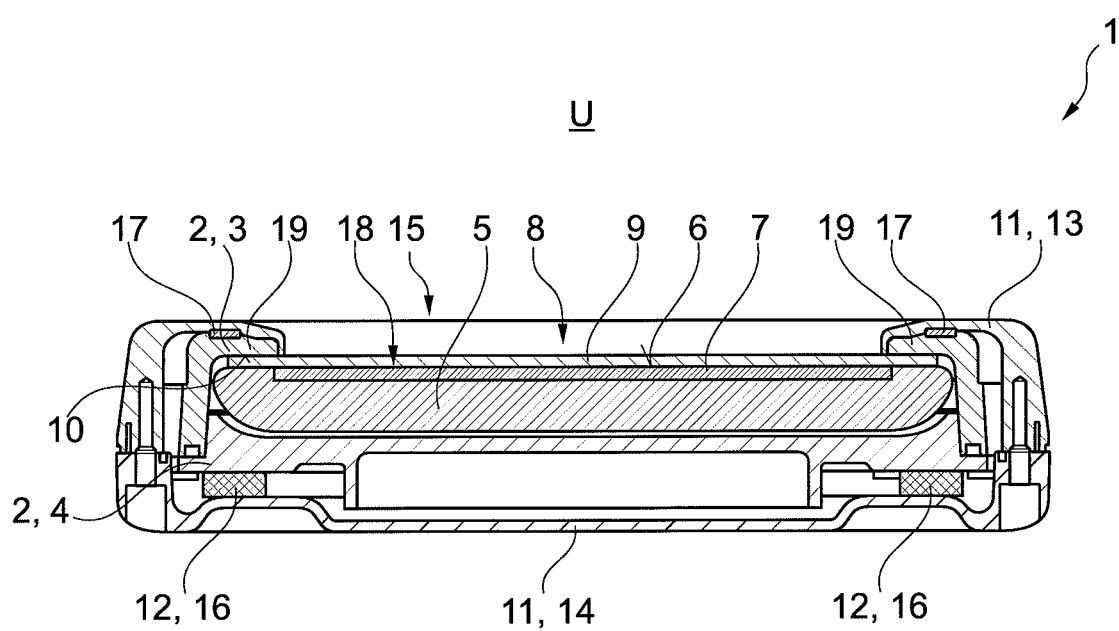

DEVICE ARRANGEMENT

CROSS-REFERENCE TO RELATED APPLICATIONS

This application claims priority to German Patent Application No. 10 2014 205 140.1, filed Mar. 19, 2014, the contents of which are hereby incorporated by reference in their entirety.

TECHNICAL FIELD

The invention relates to a device arrangement.

BACKGROUND

Modern computers are being increasingly manufactured in the form of so-called tablet computers—also known in a simplified manner in technical circles as "tablets". Such a tablet comprises a portable computer with flat geometry which has a touch-sensitive display configured in the form of a touchscreen, i.e. the display of the tablet is used at the same time as an input unit, with the result that the provision of a keypad or a mouse is superfluous. The latest generation of tablets resembles the modern smartphone in terms of their specification.

As a result of their simple handling, tablet computers are also being increasingly used in explosion-prone areas such as, for example, oil drilling platforms or similar, as a working device. For any casing in which electronic devices are mounted which are intended for use in such explosion-prone areas, inter alia requirements for their mechanical strength defined in the DIN standard EN 60079-0 apply. In this way, it should be prevented that the casing can be damaged or even destroyed by externally acting mechanical impact forces and that the device accommodated in the casing can be exposed and can come in contact with the surroundings.

SUMMARY

It is therefore the object of the present invention to provide an improved embodiment of a device arrangement comprising an electronic device, in particular a tablet computer, which is suitable for use in said explosion-prone areas.

This object is solved by a device arrangement according to the independent claims. Preferred embodiments are the subject matter of the dependent claims.

The basic idea of the invention is accordingly to surround an electronic device with an inner casing and an additional outer casing encasing the inner casing, where the inner casing is mounted on the outer casing by means of a suspension/damping device. The inner casing is in this case equipped with a first viewing window which is sealed by a transparent window pane.

In the case of a mechanical impact acting externally on the window pane, at least a portion of the energy transmitted to the casing during the impact can thus be absorbed by the damping/suspension device. This results in an improved fracture resistance of the window pane. The device arrangement presented here is therefore suitable for use in an explosion-prone area.

A device arrangement according to the invention comprises a casing with an inner casing base and an inner casing cover. In order that the display of the electronic device also remains usable in a state of the electronic device accommodated in the inner casing, the casing base has a first viewing window which is sealed by a window pane made of a transparent material. The term "transparent" is intended to cover hereinafter in particular all materials which at least partially transmit visible light for the human eye, i.e. are transparent for optical radiation of corresponding wavelengths.

The inner casing is in this case at least partially encased by another outer casing, where the inner casing is mounted by means of a suspension/damping device on the outer casing. The term "suspension/damping device" for the mounting of the inner casing on the outer casing is intended to cover in the present context any elements which have resilient properties and, alternatively or additionally also damping properties.

According to a preferred embodiment, the outer casing can also be equipped with an outer casing base and an outer casing cover. It is then useful to also provide a (second) viewing window in the additional outer casing which is aligned with the (first) viewing window provided on the inner casing. The mounting of the inner casing on the outer casing can be accomplished in this scenario in such a manner that the inner casing cover is supported in the outer casing cover by means of the suspension/damping device.

According to a further preferred embodiment, the suspension/damping device can preferably comprise at least one suspension/damping element, preferably four suspension/damping elements made of a resilient material. These may be provided, for example, in a region of the two casing covers and be arranged, in relation to a plan view of the two covers, in the region of their four corners, if the two covers have a substantially rectangular geometry in relation to the plan view. Naturally in one variant of this embodiment it is also feasible alternatively or additionally to provide further suspension/damping elements in the region of the two casing bases or at other suitable positions in the casing so that the spring-mounted or damped mounting of the inner casing on the outer casing can also be accomplished via the casing bases.

Cost advantages in the manufacture of the device arrangement presented here are obtained if an elastomer, in particular a foam which is available commercially in large quantities and at favourable price, is used as resilient material.

According to a first advantageous further development, the transparent window pane can be brought to abut substantially gap-free against a display of the electronic device. In this case, it is useful to clamp the electronic device including the window pane into the inner casing. This results in cost advantages during the manufacture. Furthermore, the window pane can simply be removed again from the display of the electronic device in the case of repair or exchange.

In an alternative second advantageous further development to this, it is proposed on the other hand to fix the window pane on the display by means of an adhesive connection. For this purpose, an intermediate space formed between window pane and the display of the electronic device can be filled with a transparent adhesive, for example, acrylate adhesive.

If the window pane is clamped into the inner casing, it is also feasible use a non-adhesive, but transparent filling material, such as water for example, to fill said intermediate space. In each case it is recommended to use substances having a high dielectric constant which preferably should have a value of at least 10, most preferably of at least 20 in order to ensure a good capacitive coupling between the window pane and the display of the electronic device. This ensures the touchscreen functionality of its display, which is absolutely essential in the case of a tablet computer.

In a further preferred embodiment the outer casing can be made of a plastic, preferably of a thermoplastic material, most preferably of polyamide. If the outer casing is implemented in the manner of a casing known as "overmold" to the relevant person skilled in the art, further damping properties are provided by the outer casing—in addition to the suspension/damping device essential to the invention, whereby the fracture or impact strength of the entire device arrangement can be further increased.

A pane thickness of the window pane which is as small as possible promotes a good capacitive coupling between window pane and display and in this way supports the required touchscreen functionality of the display. It is therefore particularly expediently proposed that the window pane should be provided with a pane thickness of 1 mm to 4 mm, preferably of 1.5 mm to 3.5 mm, most preferably of 2 mm to 3 mm.

In a further advantageous embodiment the material of the window pane can comprise a glass, preferably a toughened glass, most preferably an aluminium silicate glass. In this way, the display of the electronic casing can be protected particularly effective against external impact forces.

A particularly good suspension or damping effect and therefore an improved impact strength of the entire device arrangement is achieved by pre-tensioning the inner casing base against the outer casing base by means of the suspension/damping device.

Advantages in the mounting and fixing of the window pane on the inner casing are obtained if the first through-opening is provided on an inner casing side of the inner casing base and is bordered by a casing edge of the casing base.

Further important features and advantages of the invention are obtained from the subclaims, from the drawings and from the appurtenant description of the FIGURES by reference to the drawings.

It is understood that the features specified hereinbefore and to be explained hereinafter can be used not only in the respectively given combination but also in other combinations or alone without departing from the framework of the present invention.

BRIEF DESCRIPTION OF THE DRAWINGS

Preferred exemplary embodiments of the invention are shown in the drawings and are explained in detail in the following description. The FIGURE(s) show:

FIG. 1 illustrates a schematic longitudinal section of an exemplary device arrangement.

DETAILED DESCRIPTION

The single FIG. 1 illustrates in a schematic longitudinal section an example of a device arrangement 1 according to the invention. The device arrangement 1 comprises an inner casing 2 with an inner casing base 3 and an inner casing cover 4. The casing base 3 and the casing cover 4 are, for example, fastened to one another by means of a snap-on connection. An electronic device 5 in the form of a tablet computer is received on the inner casing 2, which electronic device is equipped with a touch-sensitive display 7 on an upper side 6. A viewing window 8 is provided in the casing base 3, which viewing window is sealed by a transparent window pane 9 made of toughened glass, for example, an aluminium silicate glass. The window pane 9 in this case has a pane thickness of about 2 mm, in variants however, other suitable values are also possible.

Advantages in the mounting and fixing of the window pane 9 on the inner casing 2 can be achieved if the first through opening 8 is provided on an inner casing side 10 of the inner casing base 3 as shown in the example scenario and is bordered by a casing edge 19 of the casing base 3.

For fixing the electronic device 5, this including the window pane 9 can be clamped into the inner casing 2. In the example shown in FIG. 1, the window pane 9 is permanently fixed on the display 7 by means of an adhesive connection. For this purpose an intermediate space formed between window pane 9 and the display 7 of the electronic device 5 can be filled with a transparent adhesive 18, for example, an acrylate adhesive.

In the case of the aforesaid clamping connection it is useful—alternatively to the use of an adhesive 18—to use a non-adhesive but transparent filling material such as, for example, water to fill said intermediate space. In both cases it is recommended to use substances having a high dielectric constant which should preferably have a value of at least 10, most preferably of at least 20, in order to achieve the required good capacitive coupling between the window pane 9 and the display 7 of the electronic device 5.

In addition to the inner casing 2, the device arrangement 1 also comprises an outer casing 11 which partially encloses the inner casing 2, on which in turn the inner casing 2 is mounted by means of a suspension/damping device 12. A particularly good suspension or damping effect and therefore an improved impact strength of the entire device arrangement 1 is achieved in this case if the inner casing base 3 is pre-tensioned with respect to the outer casing base 13 by means of the suspension/damping device 12.

As can be seen in FIG. 1, the outer casing 11 in similar manner to the inner casing 2 is also equipped with an outer casing base 13 and an outer casing cover 14. Also a (second) viewing window 15 is provided in the outer casing base 13 which is aligned with the first viewing window 8 so that the user of the tablet computer is given a view of its display 7.

In the example in FIG. 1, the inner casing cover 4 is supported on the outer casing cover 14 by means of the suspension/damping device 12. The suspension/damping device 12 itself comprises a plurality of suspension/damping elements 16 of a resilient material which can be arranged in relation to a plan view of the two covers 4, 14 in the region of its four corners. Consequently two of the four suspension/damping elements 16 can be identified in the longitudinal section of FIG. 1. In one variant however, only one single closed spring element 16 running around the edge of the outer casing cover 14 can be provided (not shown). The suspension/damping elements 16 can be made of an elastomer such as, for example a foam.

In a further variant it can also be considered to provide additional suspension/damping elements between the two casing bases 3, 13. Such a scenario is not shown in FIG. 1; on the contrary FIG. 1 shows sealing elements 17 provided between the two bases 3, 13, by means of which the two casings 2, 11 are sealed fluidically with respect to the surroundings.

The outer casing 11 can be made of a plastic, in particular of a thermoplastic material such as, for example, polyamide. If the outer casing 11 is implemented in the manner of a casing known to the person skilled in the art as "overmold", further damping properties are provided by the outer casing 11—in addition to the suspension/damping device 12 according to the invention, with the result that the impact strength of the entire device arrangement 1 can be further improved.

The invention claimed is:

1. A device arrangement, comprising:
an inner casing surrounding a cavity configured to receive an electronic device, the inner casing including an inner casing base and an inner casing cover structured to enclose the cavity on all sides and mount the electronic device between the inner casing cover and the inner casing base when the electronic device is received in the cavity, wherein the inner casing base has a first viewing window and the inner casing cover is contoured on a side facing the cavity disposed opposite of the first viewing window to support the electronic device;
a window pane composed of a transparent material, the window pane attached to at least one of the electronic device and the inner casing, wherein the window pane at least partially seals the first viewing window;
an outer casing at least partially encasing the inner casing, the outer casing including an outer casing base disposed over the inner casing base and an outer casing cover disposed over the inner casing cover;
wherein the inner casing is mounted on the outer casing via a suspension/damping device, and wherein the suspension/damping device is enclosed within the outer casing; and
wherein the suspension/damping device includes at least one suspension/damping element composed of a resilient material, the at least one suspension/damping element enclosed by the outer casing and interposed between the inner casing and the outer casing.

2. The device arrangement according to claim 1, wherein:
the outer casing base has a second viewing window;
the inner casing cover is arranged between the cavity and the outer casing cover; and
the at least one suspension/damping element is interposed between at least one of (i) the outer casing cover and the inner casing cover and (ii) the outer casing base and the inner casing base.

3. The device arrangement according to claim 2, wherein the second viewing window is aligned with the first viewing window.

4. The device arrangement according to claim 1, wherein the resilient material of the at least one suspension/damping element includes at least one of an elastomer and a foam.

5. The device arrangement according to claim 1, wherein one of:
the window pane abuts substantially gap-free against a display of the electronic device, and
an intermediate space is disposed between the window pane and a display of the electronic device, wherein the intermediate space is filled with at least one of a transparent adhesive and a non-adhesive transparent filling material.

6. The device arrangement according to claim 5, wherein the window pane has a pane thickness of 1.5 mm to 3 mm.

7. The device arrangement according to claim 1, wherein the outer casing is composed of a plastic.

8. The device arrangement according to claim 1, wherein the window pane has a pane thickness of 1 mm to 4 mm.

9. The device arrangement according to claim 1, wherein the window pane is composed of a glass.

10. The device arrangement according to claim 1, wherein the inner casing base is pre-tensioned against the outer casing base via the suspension/damping device.

11. The device arrangement according to claim 1, wherein the first viewing window is disposed on an inner casing side of the inner casing base and is bordered by a casing edge of the inner casing base.

12. The device arrangement according to claim 11, further comprising a resilient member disposed between the inner casing base and the outer casing base at the casing edge of the inner casing base.

13. The device arrangement according to claim 12, wherein the outer casing base has a second viewing window defined along the casing edge of the inner casing base, and wherein the resilient member includes a sealing element arranged to fluidically seal the inner casing base and the outer casing base from an external environment.

14. The device arrangement according to claim 1, wherein the suspension/damping device further includes a plurality of suspension/damping elements composed of a resilient material, the plurality of suspension/damping elements disposed between the inner casing and the outer casing.

15. The device arrangement according to claim 1, wherein the at least one suspension/damping element is disposed between the inner casing cover and the outer casing cover.

16. A device arrangement, comprising:
an inner casing including an inner casing base and an inner casing cover connectable to one another, the inner casing base defining a first viewing window, wherein the inner casing base and the inner casing cover of the inner casing together enclose a cavity on all sides when the inner casing base and the inner casing cover are connected, and the inner casing is configured to clamp an electronic device in the cavity between the inner casing cover and the inner casing base, wherein the inner casing base mounts a display side of the electronic device and the inner casing cover mounts a rear side of the electronic device when the inner casing base and the inner casing cover are connected;
an outer casing encasing the inner casing, the outer casing including an outer casing base and an outer casing cover, wherein the outer casing base is disposed over the inner casing base and has a second viewing window aligned with the first viewing window of the inner casing base, and the outer casing cover is disposed over the inner casing cover;
a suspension/damping device supporting the inner casing on the outer casing, the suspension/damping device including a plurality of suspension/damping elements composed of a resilient material, wherein at least one of the plurality of suspension/damping elements is interposed between the inner casing cover and the outer casing cover; and
a window pane composed of a transparent material arranged at the first viewing window, wherein the window pane at least partially seals the first viewing window.

17. The device arrangement according to claim 16, wherein the plurality of suspension/damping elements are enclosed within the outer casing.

18. The device arrangement according to claim 16, wherein the outer casing base and the outer casing cover are securable to one another along a connection, and wherein the outer casing completely encases the inner casing when the outer casing base and the outer casing cover are secured together.

19. The device arrangement according to claim 16, wherein at least one other suspension/damping element of the plurality of suspension/damping elements is disposed between the inner casing base and the outer casing base.

20. The device arrangement according to claim 16, wherein the inner casing base is pre-tensioned against the outer casing base via the at least one suspension/damping element.

* * * * *